United States Patent [19]

Takeuchi et al.

[11] Patent Number: 4,768,554
[45] Date of Patent: Sep. 6, 1988

[54] CONTROL VALVE

[75] Inventors: Kunio Takeuchi; Masaaki Kato; Keita Ozeki; Kideo Kominami, all of Aichi, Japan

[73] Assignee: Tokai TRW & Co., Ltd., Aichi, Japan

[21] Appl. No.: 919,840

[22] Filed: Oct. 16, 1986

[30] Foreign Application Priority Data

Oct. 18, 1985 [JP] Japan ................................ 60-232393

[51] Int. Cl.⁴ ............................................. F15B 13/04
[52] U.S. Cl. ............................ 137/625.24; 91/375 A; 91/467
[58] Field of Search ............................ 91/375 A, 467; 137/625.24

[56] References Cited

U.S. PATENT DOCUMENTS 4,218,041 8/1980 Bernat ........................... 137/625.4 X Primary Examiner—Gerald A. Michalsky
Attorney, Agent, or Firm—Tarolli, Sundheim & Covell

[57] ABSTRACT

A control valve is disclosed herein. The control valve includes a valve sleeve and a rotor which is rotatably inserted into the valve sleeve. The valve sleeve have a plurality of fluid passages comprising a plurality of through passages which pass through the wall of the valve sleeve and a plurality of recessed grooves axially elongated on the inside surface of the valve sleeve. The rotor has a plurality of fluid passages opposing with said fluid passages of the valve sleeve. The fluid passages of the rotor cooperate with said fluid passages of the valve sleeve to open and close fluid flow. The valve sleeve has fluid flow noise suppress means formed by many continuous undulations along side edges of the recessed groove of the valve sleeve.

3 Claims, 2 Drawing Sheets

CONTROL VALVE

BACKGROUND OF THE INVENTION

The present invention relates to an improvement in a control valve.

Generally, in the field of the power steering mechanism for vehicles, it is known to provide a control valve which controls oil feed and exhaust from an oil source to a power rotatably inserted in the valve sleeve and connected with a steering wheel shaft and having a plurality of fluid passages opposing with the fluid passages of the valve sleeve. The fluid passage of the valve sleeve is formed by a through passage which passes through the wall of the valve sleeve and a recessed groove formed on the inner surface of the sleeve. In such conventional control valve, by rotating the rotor the fluid passages of the rotor cooperate with the fluid passages of the valve sleeve to flow fluid from the fluid passages of the valve sleeve to the fluid passages of the rotor and to shut off fluid flow. However, in such known art, rather heavy fluid flow noise is generated between the fluid passages of the rotor and the recessed grooves forming a portion of the fluid passages of the valve sleeve when the fluid passages of the rotor is just aligned or just out of alignment with the fluid passages of the valve sleeve.

Conventional attempt to solve the problem and to reduce the fluid flow noise is to divide the fluid passage to reduce flow rate per one fluid passage. However, such attempt decreases total flow rate in the valve to decrease valve efficiency, and manufacturing cost of the valve also increases.

SUMMARY OF THE INVENTION

The object of the present invention is to solve the above-mentioned problem and to provide a practically useful control valve.

To attain the above mentioned object, according to the present invention, fluid flow noise suppress means formed by many undulations or crests and valleys is formed along periphery of the recessed groove.

DETAILED DESCRIPTION OF THE PREFERRED EMBODIMENTS

One embodiment of the present invention will be described in detail in conjunction with the accompanying drawings.

Figure 1:
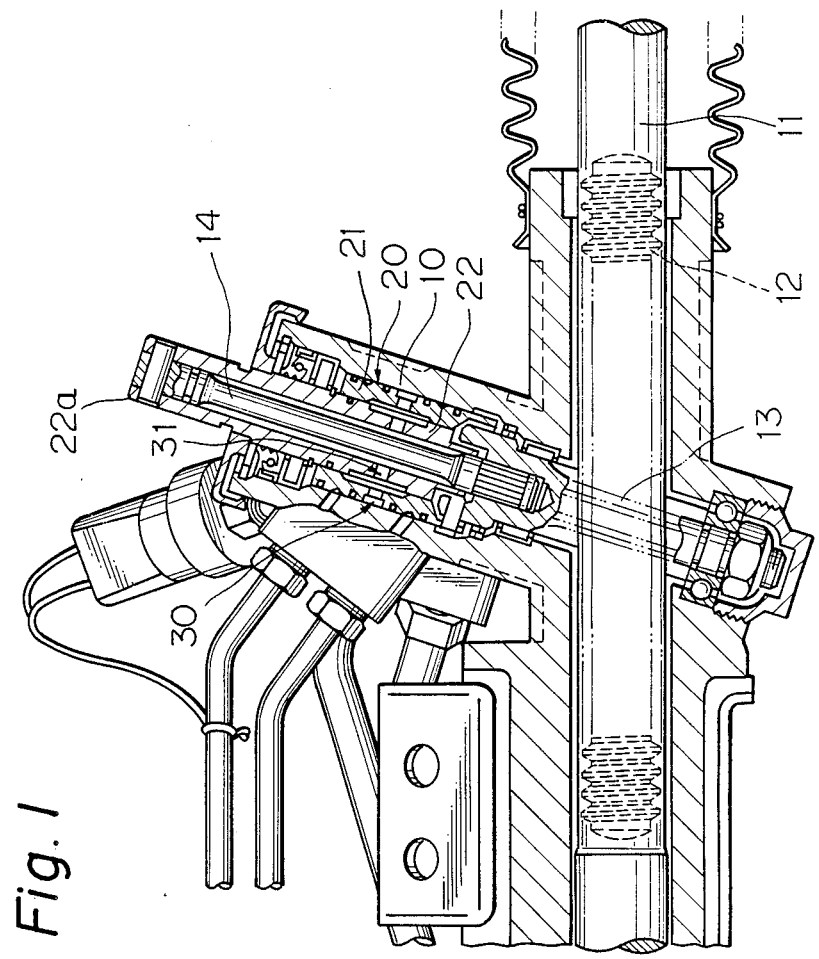
FIG. 1 is a cross-sectional view of a portion of a rack and pinion type power steering device with a control valve according to the present invention.
Figure 2:
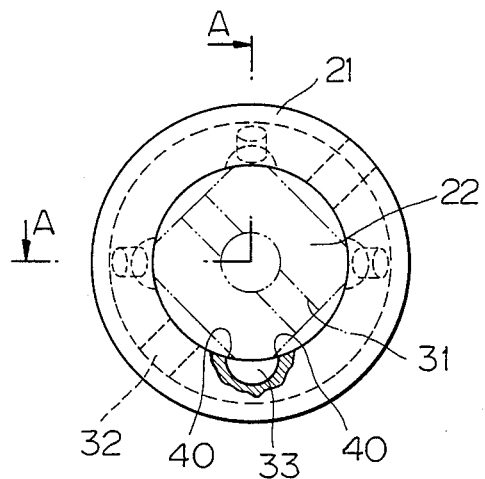
FIG. 2 is a enlarged plan view, portions of which cut away, of the control valve to show arrangement between a valve sleeve and a rotor.
Figure 3:
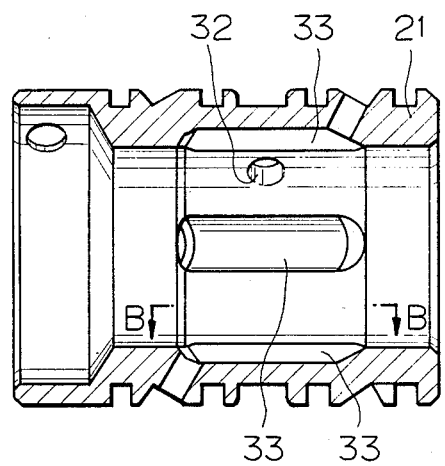
FIG. 3 is a sectional view along line A—A of FIG. 2.
Figure 4:
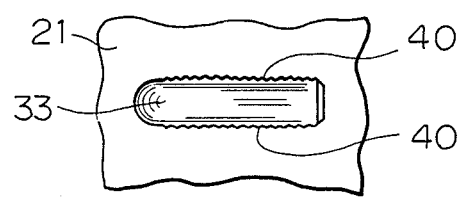
FIG. 4 is a sectional view along line B—B of FIG. 3.

Referring now to FIG. 1, there is shown a power steering device of rack and pinion type applying a control valve according to the present invention.

The power steering device comprises a housing 10, a rack rod 11 which is rotatably supported in the housing and a pinion 13 which meshes with a rack 12 formed on the rack rod 11. On both ends of the rack rod wheels, not shown, are connected through link mechanism, not shown. The rack rod is power assisted through power cylinder device, not shown.

The pinion 13 is connected with one end of a input shaft 14 which can be twisted a certain degree. The control valve 20 according to the present invention is connected with the pinion 13.

The control valve 20 includes a valve sleeve 21 which is inserted in an opening 10a which is formed in the housing 10 and rotor 22 which is rotatably inserted in the valve sleeve 21.

One end 22a of the rotor 22 is connected with the input shaft 14 on opposite end of the pinion, and the one end of the rotor is connected with a shaft of a steering wheel, not shown.

The valve sleeve 21 has a plurality of fluid passages 30, and the rotor 22 has a plurality of fluid passages 31 which are opposed with the fluid passages of the valve sleeve 21 respectively. These fluid passages cooperate with each other to control fluid flow by open or close fluid passages when the rotor is rotated. More particularly, when the steering wheel is rotated the rotor rotates and fluid e.g. oil from a fluid source, not shown, which is connected with the fluid passages of the valve sleve is supplied from the fluid passages of the valve sleeve through the fluid passages of the rotor to the power cylinder. The operation is well known and will not be described further.

As well known, the fluid passage 30 of the valve sleeve consists of a through passage 32 which passes through the wall of the sleeve and a recessed groove 33 formed on the inner surface of the sleeve communicating with the through passage.

According to the present invention, fluid flow noise suppress means 40 is formed on the side edges of each recessed groove 33. The fluid flow noise suppress means 40 is, for example, formed by continuous undulations.

The undulations can be formed by shot peening treatment or electrospark machining.

The roughness of the undulations can be selected as desired such as about 15–30 $\mu$m.

By forming undulations on the side edges of the recessed groove of the valve sleeve, according the the present invention, fluid flow noise generated between the rotor and the valve sleeve when the fluid passages of the rotor are just aligned or just out of alignment with the fluid passages of the valve sleeve can be greatly reduced, and also, fluid flow is greatly stabilized.

What is claimed is:

1. A rotary control valve for use in a vehicle power steering assembly, said rotary control valve comprising a valve sleeve, a rotor located in said valve sleeve and rotatable relative thereto, said valve sleeve having a plurality of fluid passages comprising a plurality of through passages extending through the wall of said valve sleeve and a plurality of axially extending recessed grooves on the inside surface of said valve sleeve, said rotor having a plurality of fluid passages cooperating with said fluid passages of said valve sleeve to control fluid flow therethrough upon relative rotation of said valve sleeve and rotor, and fluid flow noise suppression means comprising continuous undulations on opposite axially extending edges of said axially extending recessed grooves of said valve sleeve.

2. The control valve as set forth in claim 1, wherein the roughness of said undulations is about 15–30 $\mu$m.

3. A rotary control valve for use in a vehicle power steering assembly comprising a power steering motor and a fluid source, said rotary control valve comprising:

a valve sleeve having an axial bore and a plurality of fluid passage means communicating with said axial bore, said plurality of fluid passage means comprising a plurality of passages extending radially through the wall of said valve sleeve and a plurality of circumferentially spaced axially extending recesses on the circumferential inner surfacee of said valve sleeve, said axially extending recesses having opposite axially extending edges formed by the intersection of the inner surface of said valve sleeve with surface means defining said axially extending recesses;

a rotor located in said axial bore coaxially with said valve sleeve and rotatable relative to said valve sleeve about the axis of said valve sleeve, said rotor comprising a plurality of axially extending passages on the circumferential outer surface thereof cooperating with said axially extending recesses on the inner surface of said valve sleeve to control fluid flow from the fluid source to the power steering motor upon relative rotation of said valve sleeve and said rotor, said axially extending passages having opposite axially extending edges formed by the intersection of the circumferential outer surface of said rotor with surface means defining said axially extending passages; and fluid flow noise suppression means comprising continuous undulations formed on the opposite axially extending edges of at least one of said plurality of axially extending recesses.

* * * * *